US012784938B2

(12) United States Patent
Neubauer et al.

(10) Patent No.: US 12,784,938 B2
(45) Date of Patent: Nov. 3, 2026

(54) PRODUCTION OF SURFACE-MODIFIED CU RIBBONS FOR LASER BONDING

(71) Applicant: Heraeus Deutschland Gmbh & Co. KG, Hanau (DE)

(72) Inventors: Marcel Neubauer, Hanau (DE); Frank Krüger, Hanau (DE)

(73) Assignee: HERAEUS ELECTRONICS GMBH & CO. KG, Hanau (DE)

( * ) Notice: Subject to any disclaimer, the term of this patent is extended or adjusted under 35 U.S.C. 154(b) by 893 days.

(21) Appl. No.: 18/044,936

(22) PCT Filed: Sep. 15, 2021

(86) PCT No.: PCT/EP2021/075349

§ 371 (c)(1),
(2) Date: Mar. 10, 2023

(87) PCT Pub. No.: WO2022/058360

PCT Pub. Date: Mar. 24, 2022

(65) Prior Publication Data

US 2023/0386706 A1 Nov. 30, 2023

(30) Foreign Application Priority Data

Sep. 18, 2020 (EP) .................................... 20197055

(51) Int. Cl.
*H01B 13/00* (2006.01)
*B21B 1/16* (2006.01)
(Continued)

(52) U.S. Cl.
CPC ........... *H01B 13/0016* (2013.01); *B21B 1/16* (2013.01); *B21B 27/035* (2013.01); *B21H 8/00* (2013.01); *C22F 1/08* (2013.01)

(58) Field of Classification Search
CPC ........... H01B 13/0016; H01B 13/0006; H01B 13/0009; B21B 1/16; B21B 27/035;
(Continued)

(56) References Cited

U.S. PATENT DOCUMENTS 4,087,898 A 5/1978 Linne
5,358,906 A * 10/1994 Lee .................... H10W 70/415 29/827
(Continued)

FOREIGN PATENT DOCUMENTS

CA 2439696 A1 9/2002
CN 1130883 A 9/1996
(Continued)

*Primary Examiner* — Donghai D Nguyen
(74) *Attorney, Agent, or Firm* — Blank Rome LLP

(57) ABSTRACT

The invention relates to a method for producing a wire, having at least the following steps: (i) providing a wire precursor; (ii) pressing depressions on the wire precursor and optionally reshaping the wire precursor in the process, and (iii) annealing the wire precursor provided with depressions in order to form the wire; wherein the wire has a content of at least 95 wt. % of copper based on the total weight of the wire. The invention additionally relates to a wire which can be obtained according to the aforementioned method and to the use of a roller in order to produce the wire and/or in order to set the roughness at at least one location of the wire.

18 Claims, 3 Drawing Sheets

(51) Int. Cl.

| | |
|---|---|
| ***B21B 27/03*** | (2006.01) |
| ***B21H 8/00*** | (2006.01) |
| ***C22F 1/08*** | (2006.01) |

(58) Field of Classification Search

CPC .......... B21H 8/00; C22F 1/08; H10W 70/415; Y10T 29/4913; Y10T 29/49204

See application file for complete search history.

(56) References Cited

U.S. PATENT DOCUMENTS

| | | | | | |
|---|---|---|---|---|---|
| 5,580,617 | A * | 12/1996 | Biederer | C25D 5/34 | 427/596 |
| 5,885,892 | A * | 3/1999 | Kondo | H10W 72/701 | 438/615 |
| 7,516,637 | B2 * | 4/2009 | Scamans | B41N 3/04 | 72/197 |
| 2014/0295212 | A1 | 10/2014 | Miwa et al. | | |

FOREIGN PATENT DOCUMENTS

| | | | |
|---|---|---|---|
| DE | 102013207721 | A1 | 10/2014 |
| EP | 0667403 | A1 | 8/1995 |
| EP | 0789392 | A2 | 8/1997 |
| GB | 1130260 | A | 10/1968 |
| JP | H01148949 | A | 6/1989 |
| JP | H0446604 | * | 2/1992 |
| JP | H0446604 | A | 2/1992 |
| JP | 2010104998 | A | 5/2010 |
| JP | 2010214400 | A | 9/2010 |
| JP | 2010234417 | A | 10/2010 |
| WO | 9507775 | A1 | 3/1995 |
| WO | 2016071533 | A1 | 5/2016 |

* cited by examiner

PRODUCTION OF SURFACE-MODIFIED CU RIBBONS FOR LASER BONDING

CROSS-REFERENCE TO RELATED APPLICATIONS

This application is a U.S. National Stage of PCT/EP2021/075349, filed Sep. 15, 2021, which claims the benefit of EP Application Serial No. 20197055.5, filed on Sep. 18, 2020.

SUMMARY OF THE INVENTION

The invention relates to a method for producing a wire, comprising at least the following steps: (i) providing a wire precursor; (ii) pressing depressions on the wire precursor and optionally reshaping the wire precursor in the process, and (iii) annealing the wire precursor provided with depressions to form the wire; wherein the wire has a content of at least 95 wt. % of copper, the content being based on the total weight of the wire. The invention further relates to a wire obtainable by the aforementioned method and to the use of a roller in order to produce the wire and/or in order to set the roughness at at least one location of the wire.

BACKGROUND OF THE INVENTION

Bonding wires are used in the production of semiconductor components in order to electrically connect an integrated circuit and a printed circuit board during the production of semiconductor components. Furthermore, bonding wires are used in power electronics to electrically connect transistors, diodes and the like to the contact surfaces of the housing, also called pads or pins. While bonding wires were formerly produced from gold, today more cost-effective materials, such as copper, are used. Copper wire has very good electrical and thermal conductivity. However, copper wires are susceptible to oxidation.

In terms of the geometry of the wire, bonding wires, which have a circular cross section, and so-called ribbons, which have a more or less rectangular cross section, are most common. Both types of wire geometry have their advantages which make them useful for specific applications. Therefore, both types of geometry have their share of the market. Ribbons have a larger contact surface for a given cross-sectional area since they can rest flat on an element. However, the bendability of the ribbons is limited. Furthermore, the orientation of a ribbon must be taken into account during bonding to achieve adequate electrical contact between the ribbon and the element to which it will be connected. Bonding wires are more flexible. However, bonding comprises either welding and/or greater deformation of the wire in the bonding process, which may mean to damage or even destruction of the bond pad and the underlying electrical structures of the element connected thereto.

So-called laser bonding is of particular interest. This is a method in which the energy required for bonding is transferred to the bonding wire by means of laser beams. In this case, metal ribbons are used instead of wires since the ribbon provides a larger surface area for coupling in the laser. An advantage of bonding ribbons is that, compared with round wires, they can be easily brought into position and held there. This considerably increases the reliability of the bonding. The greater connection in the bonding of ribbons means that higher currents can be conducted via such connections. Nevertheless, there is a constant need for further improvement of the technology with respect to the bonding wire itself and to the bonding processes.

It is known that roughened surfaces demonstrate greater absorption of electromagnetic radiation due to their increased surface area. Thus, an enlarged surface area of bonding wires should also enable greater absorption of laser radiation in a laser bonding process. Surfaces can be roughened by mechanical or chemical methods (such as, for example, brushing or etching). However, these methods often lead to residues on the wire surfaces that can have a negative influence on the bond connection. In the case of mechanical methods, these residues can be abrasion products from the brushes as well as particle removal from the wire material, which can accumulate again at another location of the wire during the brushing process. During the bonding process, these residues can lead to imperfect melting of the wire during the bonding process and thus to less reliable bonded connections. In addition, overlaps of wire material can occur in the alternative methods mentioned. During laser bonding, these overlaps can cause the wire material to spatter as a result of the strong heating and sudden expansion of the air volume enclosed beneath. The spatters of the wire material can lead on the one hand to an unreliable bond result due to the loss of material and, on the other, to damaging contamination of other electronic components. In addition, chemical methods have the disadvantage that the dimension of the depressions is more difficult to configure in terms of depth and localization. For example, single-sided etching of a ribbon can only be accomplished with complex masking steps. Also, the introduction of patterns to depressions may only be achieved with increased effort.

Objects

It is an object of the present invention to at least partially overcome one or more of the disadvantages resulting from the prior art.

It is particularly an object of the invention to specify a method by means of which a wire surface optimized for the laser bonding method can be produced.

It is a further object of the invention to specify a method by means of which a wire can be produced, the at least one surface of which has a defined roughness.

It is a further object of the invention to specify a wire with a roughness which is free of impurities, residues and cavities.

A further object of the invention is a method for producing a wire, the wire surface of which absorbs the proportion of incident laser radiation during laser bonding as extensively as possible. Another object of the invention is a method for producing a wire, wherein the wire, with the same intensity of incident laser light compared to other bonding wires, heats up more strongly. A further object of the invention is a method for producing a wire, wherein no impurities or residues are formed during the laser bonding.

Another object is to simplify the production process for producing the bonding wires according to the invention, for example by reducing the required steps. Therefore, in addition to the technical advantages with the method according to the invention, cost and time savings can be achieved in the production of the wires according to the invention.

For so-called laser bonding, it is known to use bonding wires which are roughened on a side facing away from the electrical contact surface. In this case, it was observed that, with the same emitted laser radiation, more energy is transferred to the bonding wire in the case of roughened bonding wires than in the case of smooth bonding wires. Without being bound by theory, it is assumed that, as a result of the roughened side, incident laser radiation is absorbed by the bonding wire to a greater degree or less laser radiation is reflected. Nevertheless, there continues to be a need for improvement in order to further increase the quality and reliability of the bonded connection.

It has now been found that the quality of the bonded connection with respect to impurities/yield can be increased if the bonding wire is not roughened by a removal of material, that is to say by brushing or milling, but by the introduction of depressions, for example by means of embossing.

Preferred Embodiments of the Invention

The independent claims contribute to at least partially fulfilling at least one of the aforementioned objects. The dependent claims provide preferred embodiments which contribute to at least partially fulfilling at least one of the objects.

|1| A method for producing a wire, comprising at least the following steps:
- (i) providing a wire precursor;
- (ii) pressing depressions on the wire precursor; and
- (iii) annealing the wire precursor provided with depressions in order to obtain the wire; wherein the wire has a proportion of at least 95 wt. % of copper, the content being based on the total weight of the wire.

|2| The method according to embodiment |1|, wherein the pressing is selected from the group consisting of punch marking, notching, embossing, stamping, channeling and grooving, or a combination of two or more thereof.

|3| The method according to either of the preceding embodiments, wherein the pressing is carried out by rollers, preferably embossing rollers.

|4| The method according to embodiment |3|, wherein the rolling is carried out by at least one roller, wherein the roller has a cylindrical surface comprising a relief, wherein the relief is formed by height differences (D) of the cylindrical surface.

|5| The method according to embodiment |4|, wherein the height difference (D) is in a range from 3 to 9 μm.

|6| The method according to any one of the preceding embodiments, wherein the depressions pressed on the wire by the method form a pattern.

|7| The method according to any one of the preceding embodiments, wherein the method only presses depressions at a first location of the wire and the wire used comprises a plurality of locations.

|8| The method according to any one of the preceding embodiments, wherein the wire has a roughness $R_z$ in a range from 3 to 9 μm at at least one location.

|9| The method according to embodiment |7|, wherein at least one further location of the wire is smooth, wherein the at least one further location is located on a location of the wire facing away from the first location.

|10| The method according to any one of the preceding embodiments, wherein the wire is a bonding wire, preferably a ribbon.

|11| The method according to any one of the preceding embodiments, wherein an element selected from the group consisting of the wire and the wire precursor has a cross-sectional area $Q_A$ in a range from 25,000 to 900,000 $\mu m^2$, wherein the cross-sectional area $Q_A$ is arranged perpendicularly to a longitudinal direction L of the element.

|12| The method according to any one of the preceding embodiments, wherein a cross-sectional plane $Q_E$ is laid through an element selected from the group consisting of the wire precursor and the wire,
- wherein the cross-sectional plane $Q_E$ is arranged perpendicularly to a longitudinal direction L of the element,
- wherein the cross-sectional plane $Q_E$ forms a cross-sectional area $Q_A$ with the element,
- wherein the cross-sectional area $Q_A$ comprises two perpendicularly intersecting lines L1 and L2,
- wherein a shortest possible section $A_{L1}$ of the line L1 is defined by an intersection with the edge of $Q_A$, and
- wherein a longest possible section $A_{L2}$ of the line L2 is defined by an intersection with the edge of $Q_A$,
- wherein the quotient of $A_{L2}$ and $A_{L1}$ is a number of 2 or more.

|13| A wire obtainable by a method according to at least one of embodiments |1| through |12|.

|14| A device comprising at least:
- (1) a first contact surface;
- (2) a wire according to at least one of the embodiments |13| or a wire obtainable by a method according to any one of embodiments |1| to |12|;
  wherein the wire is electrically conductively connected to the first contact surface.

|15| A use of a roller comprising a relief for producing a wire, wherein the relief is characterized by a height difference (D) in a range from 3 to 9 μm, wherein depressions are introduced by the roller on at least one location of the wire.

|16| A use of a roller comprising a relief for setting the roughness $R_z$ at at least one location of a wire in a range of 3 to 9 μm, wherein the relief is characterized by a height difference (D).

|17| A method for producing a device comprising at least one electrically conductive connection, wherein the method comprises the following steps:
- (I) providing a substrate having at least a first contact surface, and a wire;
- (II) positioning the wire in a mechanical connection with the first contact surface;
- (III) heating a first location of the wire by means of electromagnetic radiation in a wavelength range from 700 to 1,100 nm,
  to obtain an electrically conductive connection between the first contact surface of the substrate and the wire,
  wherein the first location of the wire has a roughness $R_z$ in a range from 3 to 9 μm, for example from 4 to 8 μm, or 5 to 7 μm, or 4 to 9 μm, or 5 to 9 μm,
  wherein a further location of the wire facing away from the first location of the wire, which faces the contact surface, has a roughness $R_z$ in a range from 0.1 to 1 μm,
  wherein the roughness $R_z$ at at least the first location of the wire was produced by pressing, wherein the pressing is selected from the group consisting of punch marking, notching, embossing, stamping, channeling and grooving, or a combination of two or more thereof.

|18| The method according to embodiment |17|, wherein the wire is preferably obtainable by the method according to any one of embodiments |1| to |12|.

|19| The method according to embodiment |17|, wherein laser beams are selected as electromagnetic radiation.

|20| The method according to any one of embodiments |17| to |19|, wherein the wire is a ribbon. The first and further locations of the wire are then each part of a first or a further side of the ribbon, or a first or a further side of the ribbon as a whole.

|21| The method according to any one of embodiments |17| to |20|, wherein the first location of the wire or the first side of the wire is arranged on the side of the wire facing away from the first contact surface of the substrate.

|22| The method according to any one of embodiments |17| to |21|, wherein the roughness $R_z$ at at least the first location of the wire was brought about by rolling, for example embossing rolling.

|23| The method according to embodiment |22|, wherein, for rolling, a roller comprising a relief for producing a wire, wherein the relief is characterized by a height difference (D) in a range from 3 to 9 μm, wherein depressions are or were introduced by the roller on at least one location of the wire.

General

In the present description, range specifications also include the values specified as limits. An indication of the type "in the range of X to Y" with respect to a variable A consequently means that A can assume the values X, Y and values between X and Y. Ranges delimited on one side of the type "up to Y" for a variable A correspondingly mean Y and less than Y as values.

DETAILED DESCRIPTION OF THE INVENTION

A first subject matter of the present invention relates to a method for producing a wire, comprising at least the following steps:

(i) providing a wire precursor;
(ii) pressing depressions on the wire precursor; and
(iii) annealing the wire precursor provided with depressions in order to obtain the wire; wherein the wire has a content of at least 95 wt. % of copper, the content being based on the total weight of the wire.

In principle, wire precursors are considered to be all wires and raw wires that are known and appear suitable to the person skilled in the art for use for bonding in micro- and power electronics. Like the wire formed, the wire precursor is usually a single-piece object. Numerous forms are known and suitable. Preferred forms are round, ellipsoidal and rectangular in cross-sectional view. Wire for bonding that has an approximately rectangular cross section is also referred to as ribbon wire.

According to the invention, the wire comprises a content of at least 95 wt. % of copper, preferably at least 99.95 or at least 99.9 wt. %, or at least 99.99 wt. % of copper, wherein the wt. % is based on the total weight of the wire.

The wire thus comprises up to 5 wt. %, for example 4 wt. %, or 3 wt. %, of further constituents. Further constituents are considered to be all elements which are familiar and appear suitable to the person skilled in the art in the present case, in particular metals which can be alloyed with copper, and metals, metalloids and non-metals which can form intermetallic phases with copper. The following metals are preferably considered as further components: tin (Sn), iron (Fe), nickel (Ni). The following metalloids are preferably considered as further components: Si. The following non-metals are preferably considered as further components: phosphorus (P). It is also possible for combinations of two or more metals, metalloids and non-metals, both within a class (metals, metalloids, non-metals), as well as components from different classes to be used. In addition to the targeted addition of further constituents, the wire can also have impurities.

The wire precursor usually has the same content of copper as the wire formed from the wire precursor by the method according to the invention.

In a preferred embodiment, the wire precursor is a flat ribbon. This can then be cut lengthwise into a plurality of ribbon wires after step (ii) or after step (iii). According to a further preferred embodiment, the wire produced according to the invention is a ribbon.

In principle, the provision in step (i) can take place in a manner that is known and appears suitable to any person skilled in the art. Preferably, the provision is the aligning of the wire precursor in a device.

In step (ii), depressions are pressed on the wire precursor. The wire precursor can be reshaped simultaneously or subsequently. The reshaping preferably takes place at the same time as the pressing of the depressions.

The term "pressing" is understood to mean a machining of the wire which takes place substantially without removal of material. This is different to abrasive machining, in which the removal of material is caused by the abrasive machining itself. Examples of abrasive machining are brushing and polishing. As a result, a wire is lighter following abrasive machining than before the machining.

In principle, the pressing can be carried out in a manner that is known and appears suitable to any person skilled in the art. Preferably, the pressing is carried out by a measure selected from the group consisting of punch marking, notching, embossing, stamping, channeling and grooving. The pressing is particularly preferably brought about by embossing.

According to a further preferred embodiment, the pressing takes place by rolling. Rolling is understood to mean a machining method in which a material, in this case a wire precursor, is machined between two or more rotating tools. According to the invention, a relief is transferred into the wire precursor by the rolling. Preferably, the wire precursor is reshaped simultaneously during rolling. In this case, a ribbon wire can be obtained. The rolling can be carried out as both hot rolling and cold rolling. The rolling preferably takes place as cold rolling. Particularly preferably, the pressing is carried out by an embossing roller. This means that reshaping and embossing take place simultaneously and in one step.

According to a further preferred embodiment, the rolling is carried out by at least one roller. The roller often has a cylindrical surface, wherein other geometries of a roller are also known and potentially appear suitable to the person skilled in the art. According to a further preferred embodiment, the roller is equipped with a relief, wherein the relief is formed by height differences of the cylindrical surface. According to a further preferred embodiment, the relief has a pattern.

According to a further preferred embodiment, the height difference (D) of the relief of the roller is in a range from 3 to 9 μm, for example from 4 to 8 μm, or from 5 to 7 μm, or from 4 to 9 μm, or from 5 to 9 μm.

According to a further preferred embodiment, the depressions form a pattern. In the present context, a pattern means a recurring image or a recurring design. The pattern formed by the relief on the roller corresponds to the pattern of the depressions on a wire machined by rolling with the roller.

According to a further preferred embodiment, the wire has a plurality of locations, wherein the depressions are only introduced at a first location. The wire, in particular when it is a ribbon wire, preferably has a plurality of sides, wherein the depressions are only introduced on a first side.

According to a further preferred embodiment, the wire has a roughness $R_z$ at at least one location in a range from 3 to 9 μm, for example from 4 to 8 μm, or 5 to 7 μm, or 4 to 9 μm, or 5 to 9 μm. When it is a ribbon wire, the wire preferably has a roughness $R_z$ on a first side in a range from 3 to 9 μm, for example from 4 to 8 μm, or 5 to 7 μm, or 4 to 9 μm, or 5 to 9 μm. The roughness is determined according to DIN EN ISO 4287 (2010-07) and DIN EN ISO 4288 (1998-04).

According to a further preferred embodiment, at least one further location of the wire is smooth, wherein the at least one further location is located on a location of the wire facing away from the first point of the wire.

In the present context, smooth is understood to mean a location or a surface, or a part thereof, if it has a roughness $R_z$ in a range from 0.1 to 1 μm, for example from 0.2 to 0.6 μm, or from 0.2 to 0.4 μm.

If the wire is a ribbon, a part of a first side or an entire first side instead of a first location and a further location of the ribbon can have the properties described here, and a part of a further side of the ribbon or an entire further side instead of the further location can have the properties described here.

According to a further preferred embodiment, in the case of a ribbon, at least one further side of the wire is smooth, wherein the at least one further side is located on a side of the wire facing away from the first side of the wire.

According to a further preferred embodiment, an element selected from the group consisting of the wire and the wire precursor has a cross-sectional area $Q_A$ in a range from 25,000 to 900,000 $\mu m^2$, wherein the cross-sectional area $Q_A$ is arranged perpendicularly to a longitudinal direction L of the element. If the cross-sectional area of the element is not the same at all locations, the cross-sectional area $Q_A$ is calculated as the arithmetic mean of several measurements of the cross-sectional area at at least seven different locations of the element.

According to a further preferred embodiment, an element selected from the group consisting of the wire precursor and the wire has a cross-sectional plane $Q_E$ which is laid through the element, wherein the cross-sectional plane $Q_E$ is arranged perpendicularly to a longitudinal direction L of the element, wherein the cross-sectional plane $Q_E$ forms a cross-sectional area $Q_A$ with the element, wherein the cross-sectional area $Q_A$ comprises two perpendicularly intersecting lines L1 and L2, wherein a shortest possible section $A_{L1}$ of the line L1 is defined by an intersection with the edge of $Q_A$, and wherein a longest possible section $A_{L2}$ of the line L2 is defined by an intersection with the edge of $Q_A$, wherein the quotient of $A_{L2}$ and $A_{L1}$ is a number of 2 or more, for example in a range from 2 to 30, or from 5 to 20, or from 5 to 10. The cross-sectional plane $Q_E$ and the further features mentioned in this paragraph are determined as shown in FIGS. 1 and 2. If the geometry of the element, the cross-sectional plane $Q_E$ and the further features of which are to be determined, differs from the shape shown schematically in FIGS. 1 and 2, the person skilled in the art will identify and select a determination method which comes closest to the diagram shown taking the differing geometry into account. It is quite possible for a wire precursor to have a different geometry, e.g., the quotient from $A_{L2}$ and $A_{L1}$ is a number of 1. In this case, the wire precursor is round. It is then reshaped by the method such that the wire has the aforementioned quotient of 2 or more.

If the wire is a ribbon, after embossing it can optionally also be divided into a plurality of ribbons by suitable cutting processes, so that the longest possible section of the ribbon $A_{L2}$ is shortened while retaining the shortest possible section $A_{L1}$. The cutting process can optionally take place before or after the annealing of the ribbon.

A so-called tool is used for pressing. Suitable tools are in principle all devices that are known and appear suitable to the person skilled in the art.

A preferred tool is a roller. A roller is generally understood to mean a substantially cylindrical body. The roller can in principle have any diameter. Preferably, rollers having a diameter of 50-150 mm are suitable for the intended purpose. Furthermore, the roller should be formed from a material that is harder under operating conditions than an object to be reshaped. Rollers are often made of forged steel, hard metal or cast steel.

In a preferred embodiment, the tool is designed as an arrangement comprising at least one roller. Arrangements having a plurality of rollers, for example two or more rollers, are also possible. An arrangement in which at least two rollers rotate in opposite directions and the object to be reshaped is guided between the two counter-rotating rollers is suitable, for example. The two counter-rotating rollers are arranged such that a distance is provided between the two rollers. This distance is preferably equal to the thickness of the reshaped wire.

In the present case, at least one first roller has a relief on its surface. In one embodiment, the height differences of the relief on the first roller can form a pattern. When an object to be shaped passes through, the relief (also in the form of a pattern) is introduced into the object by the tool. In this case, the depth of the depressions introduced into the wire depends on the penetration depth of the relief of the first roller into the object. It is quite possible for the height difference (D) of the relief to be greater than the depressions introduced into the object. In relation to the depressions in the reshaped object, the introduced height difference (D) of the transferred relief is referred to as the roughness $R_z$ or also as the embossing depth. The reshaping of an object using rollers, wherein at least a first roller has a relief that is transferred to the object during reshaping, is also referred to as "embossing rolling". The (first) roller accordingly as "embossing roller".

In another embodiment, the pressing is carried out by stamping. A stamp is a surface provided with a relief. The relief has a height difference (D). Suitable materials for a stamp are in principle all materials that are known and appear suitable to the person skilled in the art, but in particular the same as for the rollers. During stamping, a stamp is lowered onto an object to be machined. In this case, the relief is pressed into the object until the desired depth of the depressions is formed. This often corresponds to the height difference (D) of the relief, but sometimes the depth of the depressions is less than the height difference (D) of the relief. In relation to the depressions in the reshaped object, the introduced height difference (D) of the transferred pattern is referred to as the roughness $R_z$ or also as the stamp depth. As a rule, during the stamping of an object on the side of the object facing away from the stamp, a further tool or a plate or the like is provided which is embodied such that the object to be reshaped cannot avoid the stamp, for example by distorting. Instead, the object to be reshaped is held in position in relation to the stamping direction by the further tool.

In step (iii), the wire precursor provided with depressions is annealed to form a wire. The annealing takes place below the melting temperature of copper, preferably at temperatures TG in a range from 500 to 900° C., for example in a range from 550 to 650° C., or from 750 to 850° C. The stated annealing temperature TG is the temperature that a workpiece, here the wire, has over a specified time. The annealing of the wire takes approximately 10 seconds to 6 minutes.

The annealing can be carried out discontinuously or continuously. Preferably, the annealing is carried out continuously. A continuous furnace is suitable for this purpose. In this case, a throughput path in the continuous furnace and a temperature $T_O$ of the continuous furnace is selected such that a wire passing through the throughput path for the duration specified above has the temperature $T_G$. In all cases, the furnace temperature, for example of the continuous furnace $T_O$, can be higher than the annealing temperature $T_G$. The throughput path of the continuous furnace can also be longer and have a temperature gradient at the inlets and outlets. It is also possible to use a continuous furnace with a multi-zone heater. Therefore, certain temperature profiles can be applied to a wire passing through.

The continuous furnace can be brought to temperature and maintained at temperature in a conventional manner via a heating device located in the furnace wall or acting on the furnace wall from the outside. Electric heating is suitable for this purpose. In another embodiment, the annealing temperature $T_G$ in the continuous furnace can be generated by a plasma. A nitrogen plasma can be used for this purpose, for example at a typical power of 750 W and a process gas pressure ($N_2$) of 25 mbar.

The annealing of the wire is preferably carried out in an atmosphere, for example nitrogen ($N_2$). This is also referred to as a protective gas atmosphere. In this case, the presence of oxygen ($O_2$) is excluded as much as possible to avoid superficial oxidation of the wire.

In a further embodiment of the present invention, the atmosphere has a content of up to 10 vol. %, for example in a range from 2 to 8 vol. %, or approximately 5 vol. %, of hydrogen ($H_2$). The hydrogen has a reducing effect in the protective gas atmosphere. This has the effect that copper, possibly superficially oxidized to form copper oxides (CuO or $Cu_2O$) on the wire, is reduced to elemental copper.

A second subject matter of the present invention is a wire obtainable by a method according to the first subject matter of the invention or one of the embodiments described in this regard, or a combination of a plurality of the embodiments described in this regard.

A third subject matter, preferably obtainable by the method according to the first subject matter or as an embodiment of the second subject matter, is a wire at least characterized by at least the following features:

(a) a first location of the wire, in the case of a ribbon a first side, has a roughness $R_z$ from 3 to 9 μm, for example from 4 to 8 μm, or 5 to 7 μm, or 4 to 9 μm, or 5 to 9 μm;

(b) a quotient of $A_{L2}$ and $A_{L1}$ of 2 or more, determined according to the method described in connection with the first subject matter of the invention;

(c) a content of at least 95 wt. % of copper, the content being based on the total weight of the wire (2).

The wire is preferably characterized by at least one of the following further features:

(d) at least one further location of the wire is smooth; in the case of the ribbon, at least one further side of the ribbon is smooth;

(e) the wire has a cross-sectional area $Q_A$ in a range from 25,000 to 900,000 $\mu m^2$.

More preferably, the wire has features (a) to (c), and additionally at least one of the further features (d) or (e), more preferably both features.

A fourth subject matter is a method for producing a device comprising at least one electrically conductive connection, wherein the method comprises the following steps:

(I) providing a substrate having at least a first contact surface, and a wire;

(II) positioning the wire in a mechanical connection with the first contact surface;

(III) heating a first location of the wire by means of electromagnetic radiation in a wavelength range from 700 to 1,100 nm, to obtain an electrically conductive connection between the first contact surface and the wire, wherein the first location of the wire has a roughness $R_z$ in a range from 3 to 9 μm, for example from 4 to 8 μm, or 5 to 7 μm, or 4 to 9 μm, or 5 to 9 μm, wherein a further location of the wire facing away from the first location of the wire, which faces the contact surface, a roughness $R_z$ in a range from 0.1 to 1 μm.

Laser beams are preferably selected as electromagnetic radiation. Laser beams are electromagnetic waves, often of a very narrow frequency range and having high radiation intensity. Laser beams having a wavelength in the range from 700 to 1,100 nm are particularly preferred. For example, a 400 W fiber laser having a focus diameter of 25 μm is used to heat a wire as in step (III).

In a further preferred embodiment, the wire is a ribbon. The first and further locations of the ribbon are then each part of a first or of a further side, or of a first or of a further side as a whole.

According to a further preferred embodiment, the wire mentioned in the fourth subject matter can be produced by the method described as the first subject matter of the invention, or a wire according to the second or third subject matter of the invention. Preferred embodiments of the first, second and third subject matter of the invention relating to the wire are also preferred in the fourth subject matter for the wire.

In the present context, an electrically conductive connection is understood to mean contact between two electrically conductive elements, for example a wire with a contact surface (for example of a power semiconductor) or a substrate surface (for example DCB or leadframe).

The wire according to the fourth subject matter of the invention is preferably obtainable by the method according to the first subject matter of the invention or one of the embodiments thereof.

The roughness $R_z$ according to the fourth subject matter of the invention was preferably produced at at least the first location of the wire by pressing. As pressing, a selection was preferably made from the group consisting of punch marking, notching, embossing, stamping, channeling and grooving, or a combination of two or more thereof.

For example, the roughness $R_z$ at at least the first location of the wire was caused by rolling, for example embossing rolling.

For rolling, for example, a roller could comprise a relief for producing a wire. The relief preferably had a height difference (D) in a range from 3 to 9 μm. In this way, depressions could be introduced by the roller at at least one location of the wire.

A further subject matter of the present invention is a device comprising at least:

(1) a first contact surface;
(2) a wire according to the second or third subject matter of the invention, or a wire obtainable by a method according to the first subject matter of the invention, or according to one or more of the embodiments described in this regard in each case;
wherein the wire is electrically conductively connected to the first contact surface.

Optionally, the wire can be electrically conductively connected to one or more further contact surfaces.

A fifth subject matter of the present invention relates to a use of a roller comprising a relief for producing a wire, wherein the roller has a preferably cylindrical surface, and the relief is characterized by a height difference (D) of the surface in a range from 3 to 9 μm, for example from 4 to 8 μm, or 5 to 7 μm, or 4 to 9 μm, or 5 to 9 μm, wherein depressions are introduced by the roller at at least one location of the wire. Preferably, the depressions are introduced on one side of the wire when the wire is a ribbon.

A sixth subject matter of the present invention relates to a use of a roller comprising a relief for setting the roughness $R_z$ at at least one location of a wire in a range from 3 to 9 μm, for example from 4 to 8 μm, or 5 to 7 μm, or 4 to 9 μm, or 5 to 9 μm, wherein the roller has a preferably cylindrical surface and the relief is characterized by a height difference (D) of the surface. Preferably, the roughness $R_z$ is introduced on one side of the wire when the wire is a ribbon. Preferred embodiments of the first subject matter of the invention are also preferred here, insofar as they refer to the roller, the setting of the roughness $R_z$, the roughness $R_z$ and the height difference (D).

FIGURES

In the following, the present invention is illustrated further by way of example with reference to figures and examples. Neither the figures nor the examples represent a limitation of the claimed subject matter.

FIG. 1 shows a schematic view of a wire or of a wire precursor.

FIG. 2 shows a view of a cross-sectional area $Q_A$ of the object shown in FIG. 1.

FIG. 3 schematically shows a method for introducing depressions into a wire.

FIG. 4 shows a ribbon a) with a relief, b) with brushing.

FIG. 5 schematically shows a device with a wire and a contact surface.

Test Methods a. Determining the Relief Height and Roughness

The determination of the relief height D and the roughness $R_z$ of the wire was based on the standards DIN EN ISO 4287 (2010-07) (Definition and parameters) and DIN EN ISO 4288 (1998-04) (Rules and procedures), wherein the relief height of the roller and the roughness of the wire were determined transversely to the rolling direction. In deviation from the standard DIN EN ISO 4288, as a result of the geometric conditions, the ribbon was measured over a short sampling length and over the whole measuring length. A sufficiently long sampling length was defined as at least one third of the ribbon or of the effectively used roller width. A Mahr Perthometer PCV with a 2 μm diamond tip was used. The determination was carried out at at least two different locations of the wire or the roller. The measured data were evaluated based on DIN EN ISO 4287 using the MahrSurface XCR20 V1.20-4 program.

b. Determining the Cross-Sectional Area of a Wire or Ribbon

To determine the cross-sectional area, a metallographic section was prepared and measured with the aid of an optical microscope.

EXAMPLES

In the following, the invention is illustrated further by examples. The invention is not limited to the examples and feature combinations or parameters shown therein.

1. Producing Copper Ribbons

Figure 1:
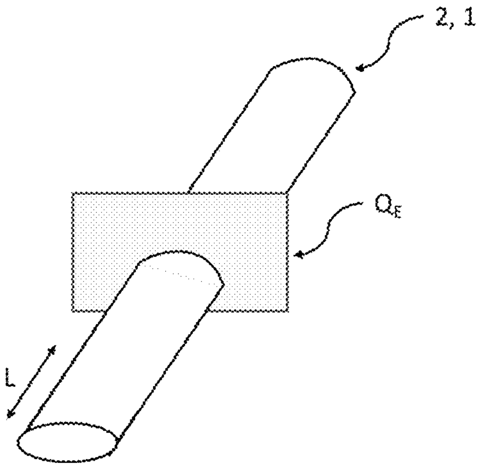
FIG. 1 shows a schematic view of a wire 2 or a wire precursor 1 characterized by its length L and a cross-sectional plane $Q_E$.
Figure 2:
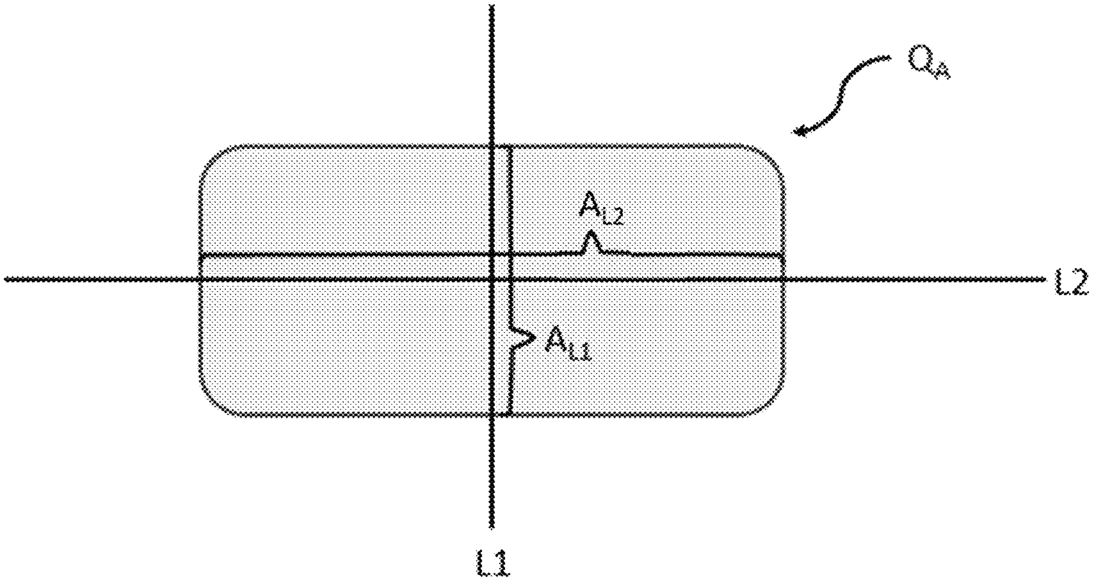
FIG. 2 shows a view of a cross-sectional area $Q_A$, as part of the cross-sectional plane $Q_E$ shown in FIG. 1. Two lines L1, L2 perpendicular to each other are laid through the cross-sectional area $Q_A$. They intersect the cross-sectional area $Q_A$ in the edges of the wire 2 or of the wire precursor 1. Therefore, the sections $A_{L1}$ and $A_{L2}$ of the lines L1 and L2 are formed.
Figure 3:
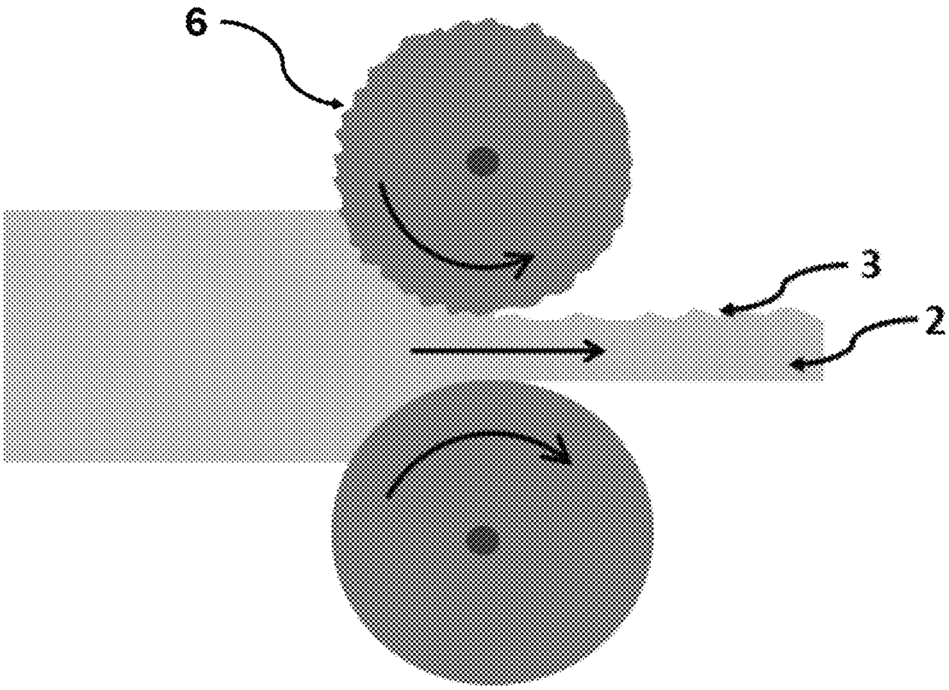
FIG. 3 schematically shows a method for introducing depressions 3 into a wire 2 by means of a roller with a relief 6 (upper roller). The lower roller is optional and can be replaced by another counter surface.
Figure 4A:
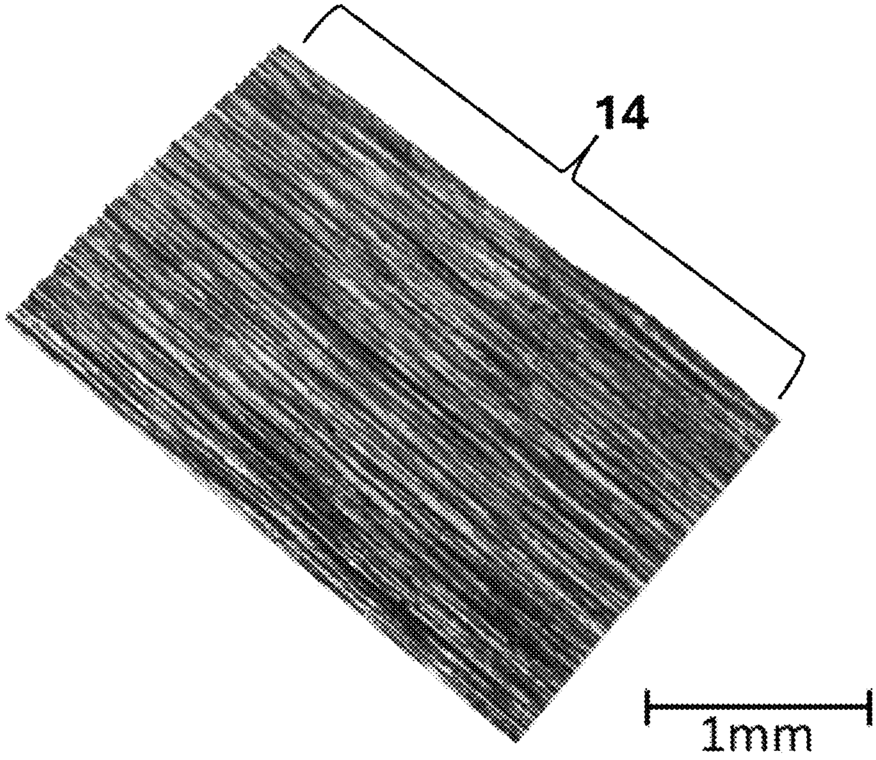
FIG. 4 shows the surface topography a) of a ribbon 2 with an introduced pattern 14 made of depressions 3; b) of a brushed ribbon.
Figure 4B:
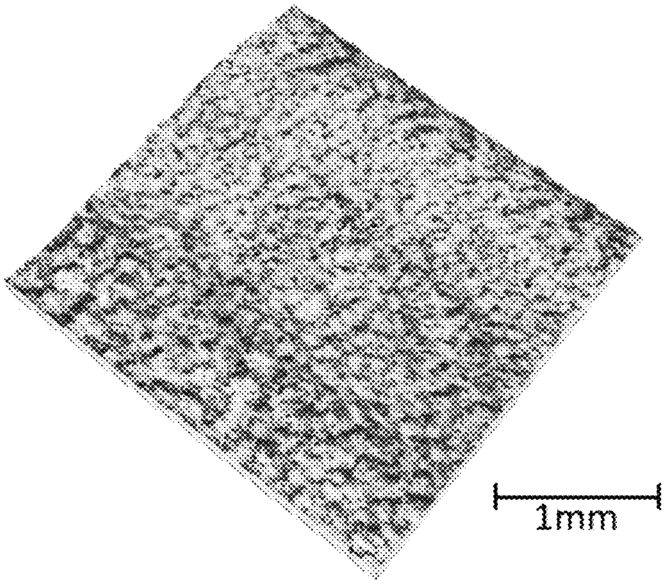
Figure 5:
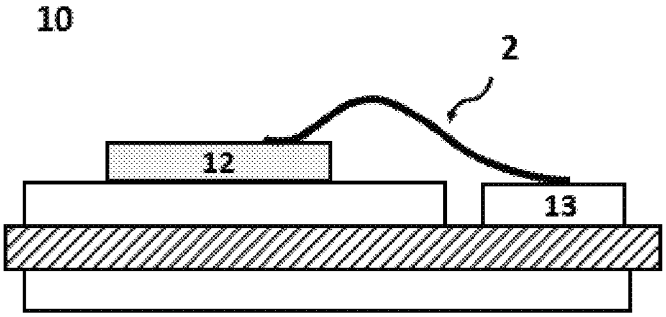
FIG. 5 schematically shows a device 10 comprising a wire 2 which connects a first contact surface 12 to a second contact surface 13.

Copper round wires having a diameter of 0.78 mm and a purity of 99.98 wt % Cu were used as the starting material. The wires were guided by a reshaping system having two rollers made of hard metal in the arrangement outlined in FIG. 3. The roller no. 1 (in the figure at the bottom) was a smooth cylinder with a diameter of 96 mm. The roller no. 2 (in the figure at the top) also had a basic cylindrical shape with a diameter of 96 mm. In the case of the reshaped wires (1)-(3), the surface of the roller no. 2 had a relief 6 with a relief height D ($D_{max}$). In the case of the reshaped wires (A) and (B), the surface of the roller no. 2 was smooth and had no relief structure whatsoever. The wires were guided between the rollers no. 1 and no. 2, rotating in opposite directions but in the direction of transport of the wires. The rollers no. 1 and no. 2 had a roller gap S between them. This was set and determined as the shortest distance between the surface of the roller no. 1 and the surface of the basic cylindrical shape of the roller no. 2, i.e., at a location without a relief. The output speed of the wires in the transport direction was identical to the rotational speed v of the rollers on the contact surface with the wire. The rolling oil used was a rapidly volatilizing rolling oil B-Clean 62S. After the rolling step, the reshaped wires (1)-(3) and (A) and (B) were annealed in a 2.5 m long continuous furnace at a throughput rate of 10 m/min and an annealing temperature $T_G$ of 650° C. in a hydrogen atmosphere. After annealing, the reshaped wires were cooled to ambient temperature. After the annealing process, the reshaped comparison wires (A) and (B) were brushed according to the characteristics in Table 2. The characteristics of the reshaped wires (1)-(3) are given in Table 1.

TABLE 1

| Ex. no. | (1) | (2) | (3) |
|---|---|---|---|
| Relief height D (μm) | 4.88 | 8.63 | 20.85 |
| $D_{max}$ roller (μm) | 5.99 | 11.41 | 22.38 |
| Roller gap size S | | 0.2 | |
| Rotational speed v | | 45 m/min | |
| Dimensions of the ribbon/cross-sectional area of the ribbon after reshaping | | 0.20 × 2.05 | |
| $R_{max}$ (μm) | 3.88 | 9.15 | 19.19 |
| Roughness $R_z$ (μm) | 3.32 | 6.824 | 18.612 |

TABLE 2

| Ex. no. | (A) | (B) |
|---|---|---|
| Dimensions of the ribbon/cross-sectional area of the ribbon after reshaping | 0.20 × 2.05 | |
| Roughness $R_{max}$ before brushing (μm) | 0.87 | |
| Roughness $R_z$ before brushing (μm) | 0.679 | |
| Brush material | High-strength steel roller brushes | |
| Brush wire diameter [μm] | 1 × 200 + 1 × 100 | 1 × 200 |
| Rotational speed of brushes [U/min] | 900 | |
| Ribbon speed [m/min] | 3 | 1 |
| Roughness $R_{max}$ after brushing (μm) | 4.55 | 10.96 |
| Roughness $R_z$ after brushing (μm) | 3.16 | 6.24 |

2. Assessing the Quality of the Reshaped Wires

| Ex. no. | (1) | (2) | (3) | (A) | (B) |
|---|---|---|---|---|---|
| Residue on the reshaped wire surface | + | + | + | − | − − |
| Spatters occurring during the laser bonding process | + | + | − − | − | − − |

For one thing, scanning electron microscope images were used to assess the quality of the reshaped wires visually with regard to unwanted residues on the surface:

+: no residues, −: little residue, −−: much residue

In the next step, the behavior of the reshaped wires during laser bonding was investigated with regard to the potential occurrence of spatter behavior. For this purpose, the reshaped wires were bonded in identically constructed electronic components under the same settings of the laser bonder. Spatters that occurred were counted using an optical microscope: +: no spatter, −: little spatter, −−: much spatter.

It was observed that the brushed, reshaped wires (A) and (B) showed residues on the surface. In this case, more residues were identified on the surface in the case of the larger depressions introduced. These residues led to spatter behavior of the brushed, reshaped wires (A) and (B) during the laser bonding process. In contrast, no residues could be found on the surfaces of the reshaped wires (1)-(3).

The reshaped wires (1) and (2) having a roughness $R_z$ of less than 9 μm did not demonstrate any spatter behavior in the laser bonding process. In contrast, the reshaped (3) having an increased roughness $R_z$ of 18.6 μm demonstrated a clear spatter behavior in the laser bonding process.

LIST OF REFERENCE SIGNS

1 Wire precursor
2 Wire
3 Depression
4 Roller
5 Surface of the roller
6 Relief
7 First side
8 Further side
10 Device
11 Substrate
12 First contact surface
13 Second contact surface
14 Pattern
D Height difference
$Q_E$ Cross-sectional plane
$Q_A$ Cross-sectional area
L Length
L1, L2 Line
$A_{L1}$, $A_{L2}$ Section

The invention claimed is:

1. A method for producing a wire, comprising:
(i) providing a wire precursor;
(ii) pressing depressions on the wire precursor; and
(iii) annealing the wire precursor provided with depressions in order to obtain the wire;
wherein the wire has a content of at least 95 wt. % of copper, the content being based on the total weight of the wire, and
wherein the depressions are only introduced at a first location of the wire precursor.

2. The method according to claim 1, wherein the pressing is performed by a process selected from the group consisting of punch marking, notching, embossing, stamping, channeling and grooving.

3. The method according to claim 1, wherein the pressing is carried out by rollers.

4. The method according to claim 3, wherein the rolling is carried out by at least one roller having a cylindrical surface comprising a relief, wherein the relief is formed by height differences of the cylindrical surface.

5. The method according to claim 4, wherein the height differences range from 3 to 9 μm.

6. The method according to claim 1, wherein the depressions form a pattern.

7. The method according to claim 1, wherein at least one location of the wire has a roughness Rz ranging from 3 to 9 μm.

8. The method according to claim 1, wherein at least one further location of the wire is smooth, wherein the at least one further location is located on a location of the wire facing away from the first location.

9. The method according to claim 1, wherein the wire is a bonding wire.

10. The method according to claim 1, wherein an element selected from the group consisting of the wire and the wire precursor has a cross-sectional area $Q_A$ in a range from 25,000 to 900,000 $\mu m^2$, wherein the cross-sectional area $Q_A$ is arranged perpendicularly to a longitudinal direction L of the element.

11. The method according to claim 1, wherein:
a cross-sectional plane $Q_E$ is laid through an element selected from the group consisting of the wire precursor and the wire,
the cross-sectional plane $Q_E$ is arranged perpendicularly to a longitudinal direction L of the element,
the cross-sectional plane $Q_E$ forms a cross-sectional area $Q_A$ with the element,
the cross-sectional area $Q_A$ comprises two perpendicularly intersecting lines L1 and L2,
a shortest possible section AL1 of the line L1 is defined by an intersection with the edge of $Q_A$, a longest possible section $A_{L2}$ of the line L2 is defined by an intersection with the edge of $Q_A$, and the quotient of $A_{L2}$ and AL1 is a number of 2 or more.

12. A wire prepared by a method according to claim 1.

13. A method for producing a device comprising at least one electrically conductive connection, wherein the method comprises the following steps:

(I) providing a substrate having at least a first contact surface, and a wire, wherein the wire is prepared by a method comprising:

(i) providing a wire precursor;

(ii) pressing depressions on the wire precursor; and (iii) annealing the wire precursor provided with depressions in order to obtain the wire;

wherein the wire has a content of at least 95 wt. % of copper, the content being based on the total weight of the wire;

(II) positioning the wire in a mechanical connection with the first contact surface; and (III) heating a first location of the wire by means of electromagnetic radiation in a wavelength range from 700 to 1,100 nm to obtain an electrically conductive connection between the first contact surface of the substrate and the wire, wherein the first location of the wire has a roughness $R_Z$ in a range from 3 to 9 μm, wherein a further location of the wire facing away from the first location of the wire, which faces the contact surface, has a roughness $R_Z$ in a range from 0.1 to 1 μm, and wherein the roughness $R_Z$ at the first location of the wire is produced by a pressing process selected from the group consisting of rolling, punch marking, notching, embossing, stamping, channeling, grooving, and any combination.

14. The method according to claim 13, wherein the first location of the wire or the first side of the wire is arranged on the side of the wire facing away from the first contact surface of the substrate.

15. The method according to claim 13, wherein the roughness $R_Z$ at the first location of the wire was brought about by rolling using a roller having a cylindrical surface comprising a relief was used to produce a wire wherein the relief has a height difference in a range from 3 to 9 μm.

16. The method according to claim 13, wherein:

a cross-sectional plane $Q_E$ is laid through an element selected from the group consisting of the wire precursor and the wire, the cross-sectional plane $Q_E$ is arranged perpendicularly to a longitudinal direction L of the element, the cross-sectional plane $Q_E$ forms a cross-sectional area $Q_A$ with the element, the cross-sectional area $Q_A$ comprises two perpendicularly intersecting lines L1 and L2, a shortest possible section AL1 of the line L1 is defined by an intersection with the edge of $Q_A$, a longest possible section AL2 of the line L2 is defined by an intersection with the edge of $Q_A$, and the quotient of AL2 and AL1 is a number of 2 or more.

17. The method according to claim 16, wherein the depressions form a pattern.

18. The method according to claim 13, wherein an element selected from the group consisting of the wire and the wire precursor has a cross-sectional area $Q_A$ in a range from 25,000 to 900,000 $\mu m^2$, wherein the cross-sectional area $Q_A$ is arranged perpendicularly to a longitudinal direction L of the element.

* * * * *